(12) United States Patent
Spiral

(10) Patent No.: US 8,925,858 B2
(45) Date of Patent: Jan. 6, 2015

(54) ANCHORING ELEMENT AND MOORING DEVICE FOR AN AIRCRAFT

(75) Inventor: Fabien Spiral, Augsburg (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 31 days.

(21) Appl. No.: 13/308,902

(22) Filed: Dec. 1, 2011

(65) Prior Publication Data
US 2012/0153079 A1 Jun. 21, 2012

(30) Foreign Application Priority Data
Dec. 16, 2010 (EP) .................... 10400065

(51) Int. Cl.
B64F 1/12 (2006.01)
B64C 27/04 (2006.01)

(52) U.S. Cl.
CPC ..................... B64F 1/125 (2013.01)
USPC .......... 244/115; 244/17.17; 244/116

(58) Field of Classification Search
USPC .................. 244/17.17, 115, 116
See application file for complete search history.

(56) References Cited

U.S. PATENT DOCUMENTS

| 2,453,857 | A | * | 11/1948 | Platt et al. | 244/17.17 |
|---|---|---|---|---|---|
| 2,471,544 | A | * | 5/1949 | Ring | 244/115 |
| 2,478,708 | A | * | 8/1949 | Raiche | 244/115 |
| 2,738,939 | A | * | 3/1956 | Johnson | 244/137.2 |
| 2,962,245 | A | * | 11/1960 | Molzan et al. | 244/115 |
| 2,969,210 | A | * | 1/1961 | Richardson et al. | 244/137.2 |
| 3,088,608 | A | * | 5/1963 | Theodore | 414/549 |
| 3,117,749 | A | * | 1/1964 | Angel | 244/17.17 |
| 3,181,823 | A | * | 5/1965 | Gillmore | 244/137.2 |
| 3,228,044 | A | * | 1/1966 | Mattenson | 441/83 |
| 3,602,461 | A | * | 8/1971 | Cody et al. | 244/63 |
| 3,640,490 | A | | 2/1972 | Baekken | |
| 3,801,050 | A | * | 4/1974 | Stone | 244/115 |
| 4,258,888 | A | * | 3/1981 | Sawn | 244/17.17 |
| 4,296,898 | A | * | 10/1981 | Watson | 244/115 |
| 4,736,906 | A | * | 4/1988 | Taillet | 244/1 A |
| 4,750,691 | A | * | 6/1988 | Hollrock et al. | 244/137.1 |
| 4,993,665 | A | * | 2/1991 | Sparling | 244/118.1 |
| 5,020,742 | A | * | 6/1991 | Haslim | 244/137.2 |
| 5,190,250 | A | * | 3/1993 | DeLong et al. | 244/137.1 |

(Continued)

FOREIGN PATENT DOCUMENTS

| EP | 0052966 | 6/1982 |
|---|---|---|
| EP | 0839715 | 5/1998 |

(Continued)

OTHER PUBLICATIONS

Search Report and Written Opinion; Application No. EP 10400065 Dated: May 11, 2011.

Primary Examiner — Timothy D Collins
Assistant Examiner — Steven Hawk
(74) Attorney, Agent, or Firm — Brooks Kushman P.C.

(57) ABSTRACT

An anchoring element (2) intended to be fixed on at least one external anchor point (4) of an aircraft's fuselage, comprising a fixing area (5) for ensuring the fixing of the anchoring element (2) on the external anchor point (4) and said anchoring element (2) comprising an anchor means for the connection to attaching means, characterized in that the fixing area (5) comprises means for fixing the anchoring element (2) also to a additional external anchor point (6) of the aircraft's fuselage and said fixing area (5) comprising an extension area (7) on which is located the anchor means.

20 Claims, 2 Drawing Sheets

(56) References Cited

U.S. PATENT DOCUMENTS

| | | | |
|---|---|---|---|
| 5,509,624 A * | 4/1996 | Takahashi | 244/115 |
| 5,762,297 A * | 6/1998 | Ascherin et al. | 244/137.1 |
| 6,016,997 A | 1/2000 | Wendt et al. | |
| 6,334,590 B1 * | 1/2002 | Landry | 244/137.1 |
| 6,488,236 B2 * | 12/2002 | Landry | 244/137.1 |
| 6,805,321 B2 * | 10/2004 | Rodier et al. | 244/115 |
| 6,942,177 B1 * | 9/2005 | Marcaccio | 244/1 A |
| 7,059,564 B2 * | 6/2006 | Dennis | 244/115 |
| 7,134,627 B2 * | 11/2006 | Warin et al. | 244/115 |
| 7,946,530 B1 * | 5/2011 | Talmage, Jr. | 244/118.2 |
| 8,292,229 B2 * | 10/2012 | Pancotti et al. | 244/129.5 |
| 8,567,710 B2 * | 10/2013 | Hayashi | 244/17.11 |
| 2002/0020783 A1 * | 2/2002 | Landry | 244/137.1 |
| 2007/0215752 A1 | 9/2007 | Steinkerchner et al. | |
| 2009/0146010 A1 * | 6/2009 | Cohen | 244/137.1 |
| 2010/0096508 A1 * | 4/2010 | Pancotti et al. | 244/7 R |
| 2010/0213316 A1 * | 8/2010 | Hayashi | 244/129.1 |
| 2011/0233332 A1 | 9/2011 | Proutiere | |

FOREIGN PATENT DOCUMENTS

| | | |
|---|---|---|
| EP | 0894716 | 2/1999 |
| FR | 2742104 | 6/1997 |
| FR | 2861689 | 5/2005 |
| FR | 2933954 | 1/2010 |
| GB | 1159323 A | 1/1968 |
| WO | 9104910 A1 | 4/1991 |

* cited by examiner

ANCHORING ELEMENT AND MOORING DEVICE FOR AN AIRCRAFT

CROSS REFERENCE TO RELATED APPLICATIONS

This application claims priority to European application no. EP 10 400065.8, filed Dec. 16, 2010, the disclosure of which is incorporated in its entirety by reference herein.

BACKGROUND OF THE INVENTION (1) Field of the Invention

The present invention relates to the general technical field of the mooring of an aircraft and more particularly a helicopter on a boat deck or on the ground.

(2) Description of the Prior Art

While mooring an aircraft, which has to be done fast in order to allow a secured landing and mooring even in bad weather conditions on a ship deck, there might be a risk of contact between the aircraft and the means used to maintain under tension the aircraft on the deck (like mooring chains or similar textile straps). Moreover the mooring point on an aircraft has to be easily accessible and the means used to attach the HC (helicopter) on the ground shall limit as less as possible the door opening or the accessibility of any component of the aircraft.

This invention applies to different types of aircrafts but in particular to helicopters or to any other aircrafts.

It is known for mooring an aircraft, to use an anchoring point which is a ring, or an element with a similar form, just screwed in the frame structure of the fuselage of the aircraft. One or more of such anchoring points can be found on some aircrafts. Such a ring is very close to the structure so that in some cases, the mooring chains can damage the structure when they are under tension. These chains can also in some cases limit the opening of the door. The known metallic rings are also sensitive to deformation strengths. When this existing mooring device is in place, the door of the aircraft can not be opened in some cases. Deporting such a ring or such an attachment point, like a hook in case of use of textile straps, away from the frame structure would lead to high efforts generated on the frame structure and in consequence to a high risk of deformation.

It is also known to use a device based on ground equipment for mooring an aircraft on a deck or on the ground. This device deports, with the help of one or more arms comprising on the free end of each arm, a mooring ring. The mooring rings constitute so anchoring points, deported from the frame structure of the aircraft. With using such ground equipment, the efforts are safely transmitted with regard to structural parts of the helicopter.

This ground equipment is very heavy and is not flyable. It is also ergonomically unpractical since it takes at least one minute to install it on the aircraft which is unacceptable for a use on a ship deck in case of heavy weather. It needs too much time and material to be installed.

The document U.S. Pat. No. 3,640,490 A discloses means for transporting a landed helicopter on the deck of a ship at sea. A probe on the helicopter is grasped in a trap device mounted on a turntable provided on the deck of the ship. A dolly device is then moved into position and the helicopter clamped to it. The dolly device is guided by suitable rails so that, once the helicopter is clamped to it and unclamped from the trap device, the helicopter under full restraint can be moved along the deck to a parking space.

The document GB 1159323 A discloses a device for anchoring a body, e.g. a helicopter to a flight deck having T-slots, comprising a tube extending from the body housing a set of dogs, a pin movable along the tube to spread the dogs to a fastening position and a retaining device, e.g. a ring, to retain the dogs in a non-fastening position, and being movable, e.g. upwards by striking the flight deck shown in broken lines, to release the dogs to allow them to be spread by the pin.

The document WO 9104910 A1 discloses a securing device, for example for securing an aircraft to the deck of a ship with a pair of jaws arranged to engage a fixed member on the ship. Normally, the jaws are locked open by means of a detent, but when the member hits a striker plate, this plate moves from a detent position to an open position in which, on operation of a locking plunger the jaws may be closed. The entire mechanism is connected to a ram which is arranged to retract when the jaws are locked in position, so pulling the aircraft firmly down onto the deck of the ship. The control circuit for operating the lock includes a pressure regulator arranged to lower the entire system pressure, and therefore the impact load on the deck, as the ram is being extended. In addition, when it is desired to uncouple the lock from the deck, there are means for putting the ram into compression just prior to uncoupling, so that the tensile securing loads are substantially cancelled.

BRIEF SUMMARY OF THE INVENTION

Consequently the objective of the present invention is to remedy the aforementioned disadvantages and propose a new and simple way to handle anchoring elements of an aircraft.

Another objective of the present invention is to propose a new anchoring element which is light and less sensitive to deformation strengths.

Another objective of the present invention is to propose a new particularly reliable and flyable anchoring element for an aircraft.

Another objective of the present invention is to propose a new and reliable mooring device for an aircraft, which avoids damage, when it is used, on the composite structure of the aircraft.

The objectives of the invention are achieved by using an anchoring element intended to be fixed on at least one external anchor point of an aircraft's fuselage, comprising a fixing area for ensuring the fixing of the anchoring element on the external anchor point and said anchoring element comprising an anchor means for the connection to attaching means, characterized in that the fixing area comprises means for fixing the anchoring element also to a additional external anchor point of the aircraft's fuselage, said fixing area comprising an extension area on which is located the anchor means.

According to an embodiment of the invention, the anchor means is a hook.

According to another embodiment of the invention, the anchor means is a ring or an element with a similar form. The ring can be closed or not closed. The ring can also have a circular form or another form.

According to an exemplary embodiment of the invention, the anchoring element is removable.

According to an embodiment of the invention, the anchoring element is a flyable element.

According to a preferred embodiment of the invention, the anchoring element comprises a one piece structure made of metallic and/or composite materials or at least any solid material.

According to an embodiment of the invention, the extension area is bent at a determined angle with respect of the fixing area, in order to locate its free end comprising the anchor means in a position deported from the fuselage. The deporting of the anchorage point for the chains' pliers or for similar attaching means like standard chains or textile straps, to maintain fixed the aircraft under tension on the ground, avoids any contact between a chain (or a part of the attaching means) and any frame parts, the door and the door's sliding mechanism of the helicopter or aircraft.

According to an embodiment of the invention, the fixing part has a shape which fits with the external surface of the fuselage.

The objectives of the invention are also achieved with a mooring device for an aircraft comprising an anchoring element as described above and attaching means, characterized in that the attaching means comprises a chain with pliers on at least one end, a rope or a Nylon strap and a tender for increasing or decreasing the length of the attaching means. The pliers are used to fix the chains on a ring.

According to an embodiment of the invention, the attaching means comprises a metallic chain and the anchor means is a ring.

According to another embodiment of the invention, the anchor means is a hook and the attaching means comprises a Nylon strap at least in the vicinity of the anchor means. The use of a hook makes it possible to fix textile straps which are very easy and fast to install on the aircraft in order to maintain under tension the aircraft.

The attaching means can also comprise a textile strap or any light, flexible and with high resistance to high tensions material. But in the case no chains are used, there are no more pliers needed at the end of the attaching means.

The objectives of the invention are also achieved with a helicopter comprising a frame structure of a fuselage which comprises a first external anchor point, an additional external anchor point and an anchoring element as described above, characterized in that the additional external anchor point is a heavy store carrier's upper anchor point.

An advantage of the anchoring element conforming to the invention, resides in the fact that it is very easy to use. The anchoring element can be installed or removed within a few seconds.

Another advantage of the anchoring element conforming to the invention lies in its simplicity of manufacturing, in its limited number of manufacturing pieces and in the corresponding reduction of costs.

Another advantage of the anchoring element conforming to the invention lies in the use of two existing anchor points on the aircraft's frame structure. These existing anchor points are able to support some consequent efforts. No modification on the frame structure is needed for installing, like a plug and play device, the anchoring element.

Another advantage of the anchoring element conforming to the invention lies in the fact that it is flyable. Indeed, such an anchoring element will not harm or have a very limited impact on the aerodynamic performances of the helicopter (low flying velocity).

BRIEF DESCRIPTION OF THE SEVERAL VIEWS OF THE DRAWINGS

The invention and its advantages will appear with greater detail in conjunction with the description which follows with execution and implementation examples, given as illustration and without limitation, with reference to the attached figures which shows.

DETAILED DESCRIPTION OF THE INVENTION

The identical structural and functional elements, which are shown in several different figures or illustrations, are given one single numeric or alphanumeric reference.

Figure 1:
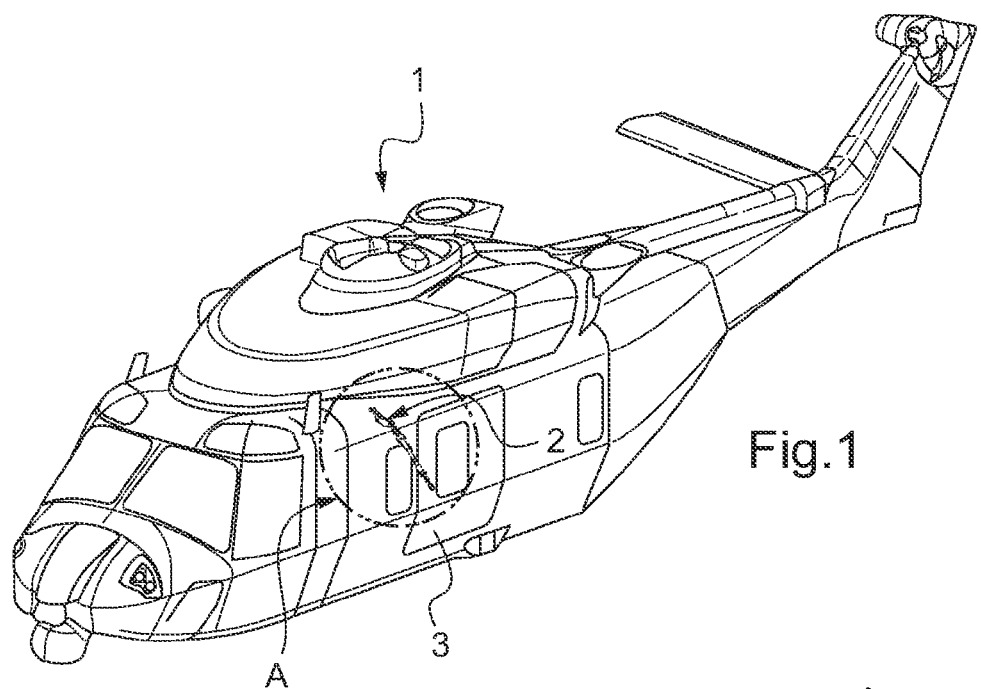
FIG. 1, illustrates a perspective view of an helicopter comprising an exemplary embodiment of an anchoring element according to the invention.

The FIG. 1 illustrates a perspective view of a helicopter 1 comprising an exemplary embodiment of an anchoring element 2 according to the invention. Such an anchoring element 2 is for instance installed on the right side and on the left side of a frame structure 1a of the helicopter 1. The anchoring element 2 is located in the vicinity and above a sliding path of the upper side of a door 3 of the helicopter 1.

Figure 2:
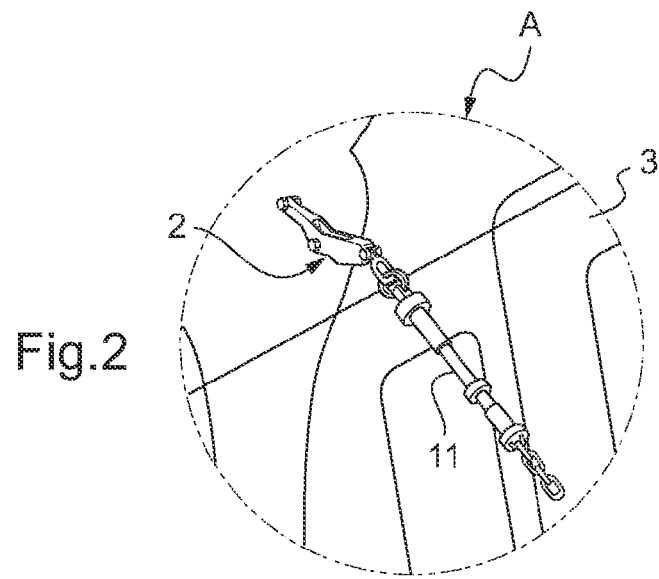
FIG. 2 illustrates an enlarged view of a part of FIG. 1, showing the anchoring element.
Figure 3:
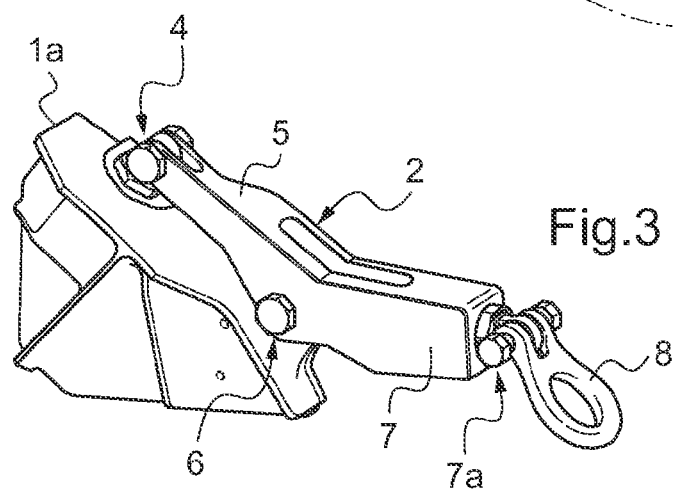
FIG. 3 illustrates an enlarged view of an exemplary embodiment of an anchoring element according to the invention.

The FIG. 2 illustrates an enlarged view of a part A of FIG. 1, showing the anchoring element 2 and FIG. 3 illustrates an enlarged and detailed view of an exemplary embodiment of the anchoring element 2 according to the invention.

Figure 4:
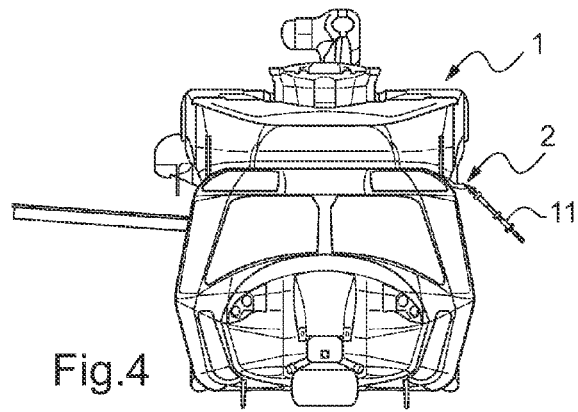
FIG. 4 illustrates a front view of the helicopter of FIG. 1, comprising an exemplary embodiment of an anchoring element according to the invention.
Figure 5:
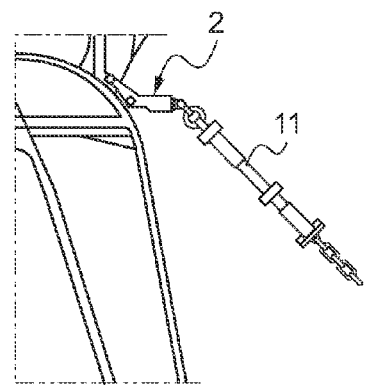
FIG. 5 illustrates an enlarged view of a part of FIG. 4, showing the anchoring element.

The FIG. 4 illustrates a front view of the helicopter 1 of FIG. 1, comprising the exemplary embodiment of the anchoring element 2 according to the invention and FIG. 5 illustrates an enlarged view of a part of FIG. 4, showing the said anchoring element 2.

Figure 6:
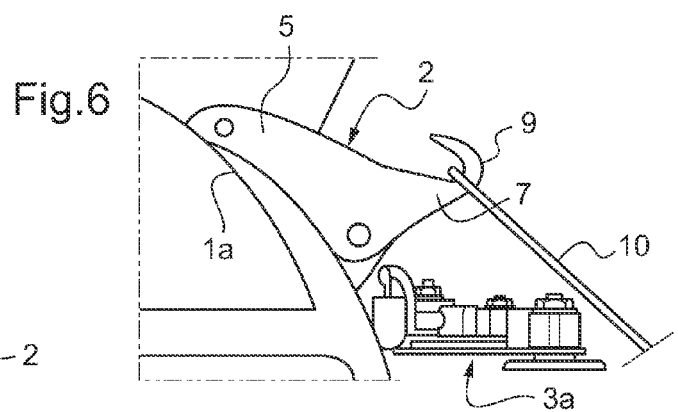
FIG. 6 illustrates an enlarged view of another exemplary embodiment of the anchoring element and a mooring device according to the invention.
Figure 7:
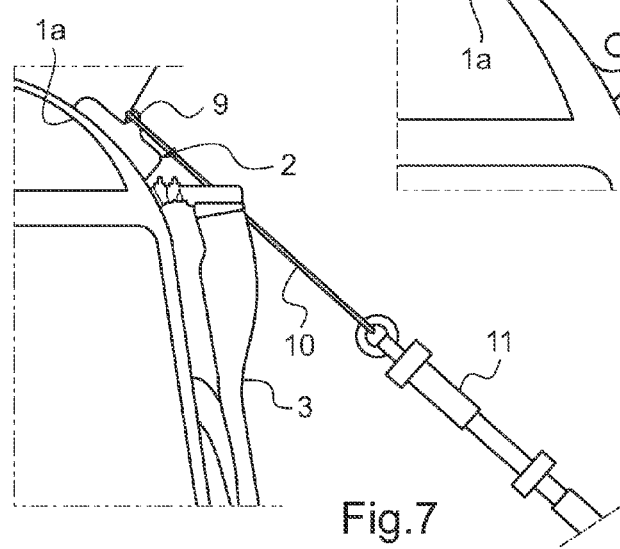
FIG. 7 illustrates an enlarged view of another exemplary embodiment of an anchoring element and a mooring device according to the invention.

The FIGS. 6 and 7 show each an enlarged view of another exemplary embodiment of the anchoring element 2 and a corresponding mooring device according to the invention.

The anchoring element 2 is intended to be fixed on an external anchor point 4 of an aircraft's fuselage or frame structure. Such an external anchor point 4 is already provided on the frame structure 1a of the helicopter 1.

The anchoring element 2 comprises a fixing area 5 for ensuring the fixing of the anchoring element 2 on the external anchor point 4.

The anchoring element 2 comprises an anchor means for the connection to attaching means which constitutes the mechanical link with a deck or with the ground. For instance, pliers and chains are used in standard NATO mooring chains.

The fixing area 5 comprises means for fixing the anchoring element 2 to an additional external anchor point 6 of the aircraft's fuselage. This additional external anchor point 6 is for instance a heavy store carrier's upper anchor point of the helicopter 1.

The fixing area 5 comprises also an extension area 7 on which is located the anchor means. The anchor means is for example a ring 8 or a hook 9.

In an advantageous exemplary embodiment of the invention, the anchoring element 2 is a removable and a flyable element.

According to a preferred embodiment of the invention, the anchoring element 2 is a one piece structure made of metallic or composite materials. The fixing area 5 is affixed to the frame structure 1a with screws and/or bolts or with any other known fixing means.

According to an embodiment of the invention, shown for instance in FIG. 3, the extension area 7 is a part which is bent at a determined angle with respect to the fixing area 5, in order to locate its free end 7a comprising the anchor means, in a position deported from the frame structure 1a.

According to an embodiment of the invention, the fixing area 5 has a shape which fits with the external surface of the fuselage and/or at least which permits an attachment to the two external anchor points 4 and 6.

The objectives of the invention are also achieved with a mooring device for an aircraft comprising the anchoring element 2 as described above and attaching means. These attaching means comprises a chain, a rope or a Nylon strap 10 and a tender 11 for increasing or decreasing the length of the attaching means.

According to another embodiment of the invention illustrated in FIGS. 6 and 7, the attaching means comprises a Nylon strap 10 or a Nylon strap portion at least in the vicinity of the anchor means. The extension of this Nylon strap could be chain.

In FIG. 6, the anchor means is the hook 9 on which is connected a ring or a loop of the Nylon strap 10. The deported hook 9 will ensure that the door 3 or its opening and sliding mechanism 3a will hit the Nylon strap 10.

In the alternative embodiment of FIG. 7, the hook 9 is no more deported. The use of the Nylon strap 10 will reduce significantly in case of contact, the risk of injuring the composite material of the door 3 during its opening. This risk of contact or a limited door opening (nevertheless, a minimal door opening in line with safety requirements for passenger transport is still ensured) is balanced by the fact that the forces on the frame structure 1a during the mooring are much lower.

Unsurprisingly, the present invention is subject to several variations in terms of its implementation. Although several execution and implementation modes have been described, it is clear that identifying all possible modes exhaustively is inconceivable. It is, of course, possible to replace any feature described above with an equivalent feature and still remain within the scope of the present invention.

What is claimed is:

1. An anchoring element fixably coupled to an aircraft's fuselage above a sliding path of an upper side of an aircraft door, said anchoring element comprising:
    a fixing area for ensuring the fixing of the anchoring element on the aircraft fuselage; and
    an extension area including an anchor means for connection to an attaching means,
    wherein the fixing area comprises a first connection point fixed to a first external anchor point of the aircraft's fuselage and a second connection point fixed to a second external anchor point of the aircraft's fuselage, and wherein the fixing area and extension area are an integral structure made of a solid material.

2. An anchoring element according to claim 1, wherein the anchor means is a hook.

3. An anchoring element according to claim 1, wherein the anchor means is selected from the group consisting of a closed ring, a ring that is at least partially closed, a half ring, and an oval ring.

4. An anchoring element according to claim 1, wherein it is removable.

5. An anchoring element according to claim 1, wherein the anchoring element is a flyable element.

6. An anchoring element according to claim 1, wherein the anchoring element is made of metallic material.

7. An anchoring element according to claim 1, wherein the extension area is bent at a determined angle with respect to the fixing area, in order to locate its free end comprising the anchor means, in a position deported from the fuselage or a frame structure of the aircraft.

8. An anchoring element according to claim 1, wherein the fixing area has a shape which fits with the external surface of the fuselage.

9. A mooring device for an aircraft comprising an anchoring element according to claim 1 and attaching means, wherein the attaching means comprises a chain with pliers on at least one end, a rope or a Nylon strap and a tender for increasing or decreasing the length of the attaching means.

10. A mooring device according to claim 9, wherein the anchor means is a ring and the attaching means comprises a metallic chain.

11. A mooring device according to claim 9, wherein the anchor means is a hook and the attaching means comprises a Nylon strap at least in the vicinity of the anchor means.

12. A helicopter comprising a frame structure which comprises a first external anchor point, an additional external anchor point and an anchoring element according to claim 1, wherein the additional external anchor point is a heavy store carrier's upper anchor point.

13. An anchoring element connected to an aircraft fuselage, the anchoring element comprising:
    an elongate member comprising a first end, a second end opposite from the first end, and an intermediate portion extending between and connecting the first and second ends, the elongate member having a first aircraft connection point at the first end, a second aircraft connection point in the intermediate portion, and an anchor connection point at the second end, the elongate member being shaped to accommodate an external portion of an aircraft's fuselage between the first and second aircraft connection points and having an angled portion proximate the second aircraft connection point to project the anchor connection point from the aircraft's fuselage when the anchoring element is connected to the aircraft's fuselage, each of the aircraft connection points being secured to a respective anchor point at an upper portion of the aircraft's fuselage, wherein the elongate member is an integral piece.

14. An anchoring element according to claim 13, wherein the anchor connection point is a hook.

15. An anchoring element according to claim 13, wherein the anchor connection point is one of a closed ring, a ring that is at least partially closed, a half ring, and an oval ring.

16. A helicopter comprising:
    a fuselage including a sliding door defining a sliding path and a frame having a first external attachment point and a second external attachment point, the first and second external attachment points being spaced apart and located above the sliding path; and
    an anchoring element including an attachment member, an extension member extending from the attachment member, and an anchoring point located on the extension member, the attachment member being connected to the first and second external attachment points and contoured to fit the fuselage therebetween, wherein the extension member and the attachment member are an integral piece.

17. A helicopter according to claim 16, wherein the extension member has a proximal end and a distal end, the proximal end being connected to the attachment member and the distal end being connected to the anchoring point, the extension member projecting the anchoring point away from the fuselage above the sliding path of the door to avoid contact between a mooring line and the door.

18. A helicopter according to claim 16, wherein the extension member and the attachment member form an elongate beam with a first end, a second end opposite from the first end, and an intermediate portion extending between and connecting the first and second ends, with the first external attachment point at the first end, the anchoring point at the second end, and the second external attachment point at the intermediate portion.

19. An anchoring element according to claim 1, wherein the anchoring element is made of composite material.

20. An anchoring element according to claim 13, wherein the angled portion is between the second aircraft connection point and the anchor connection point.

* * * * *